US007720079B2

(12) United States Patent
Robinson et al.

(10) Patent No.: US 7,720,079 B2
(45) Date of Patent: May 18, 2010

(54) DATA TRANSFER PROCEDURE FOR TRANSFERRING DATA OF A DATA SEQUENCE BETWEEN A TRANSMITTING ENTITY AND A RECEIVING ENTITY

(75) Inventors: Nigel P. Robinson, Farnborough (GB); Emmanuel Damaskakos, Farnborough (GB)

(73) Assignee: Qualcomm Incorporated, San Diego, CA (US)

( * ) Notice: Subject to any disclaimer, the term of this patent is extended or adjusted under 35 U.S.C. 154(b) by 763 days.

(21) Appl. No.: 10/537,836

(22) PCT Filed: Nov. 27, 2003

(86) PCT No.: PCT/GB03/05147

§ 371 (c)(1),
(2), (4) Date: Jan. 13, 2006

(87) PCT Pub. No.: WO2004/054180

PCT Pub. Date: Jun. 24, 2004

(65) Prior Publication Data

US 2006/0140197 A1 Jun. 29, 2006

(30) Foreign Application Priority Data

Dec. 6, 2002 (GB) .................................. 0228521.1

(51) Int. Cl.
*H04L 12/56* (2006.01)
(52) U.S. Cl. .................... 370/401; 370/412; 370/394
(58) Field of Classification Search ................. 370/231, 370/235, 389, 349, 401
See application file for complete search history.

(56) References Cited

U.S. PATENT DOCUMENTS 5,734,643 A * 3/1998 Rondeau ..................... 370/279
6,301,249 B1 * 10/2001 Mansfield et al. ........... 370/394
6,463,055 B1 * 10/2002 Lupien et al. ............... 370/353

(Continued)

*Primary Examiner*—Derrick W Ferris
*Assistant Examiner*—Mohammad Anwar
(74) *Attorney, Agent, or Firm*—Nicholas J. Pauley; Abdollah Katbab (57) ABSTRACT

A data transfer procedure enables data of a data sequence to be transferred between a transmitting entity (13) and a receiving entity (19). The entities each comprise a higher data handling layer (11, 17) and a lower data handling layer (12, 18). The procedure comprises transferring down from the higher data handling layer (11) of the transmitting entity (13) to the lower data handling layer (12) of the transmitting entity a data unit of the data sequence, which data unit comprises one or more segments. The or each segment is transmitted from the lower data handling level (12) of the transmitting entity (13) to the lower data handling level (17) of the receiving entity (19) via a transmission link between the transmitting entity (13) and the receiving entity (19). An acknowledgement of receipt of the or each segment is sent from the lower data handling level (17) of the receiving entity to the lower data handling level (12) of the transmitting entity. The or each segment is transferred from the lower data handling layer (17) of the receiving entity to the higher data handling layer (18) of the receiving entity in data sequence order. The higher data handling layer of the transmitting entity (13) is arranged to retain a copy of the data unit until such time as an at least implied acknowledgement of receipt of earlier segments in the sequence is sent back from the receiving entity (19) to the lower data handling level of the transmitting entity.

24 Claims, 4 Drawing Sheets

U.S. PATENT DOCUMENTS

| | | | |
|---|---|---|---|
| 6,621,796 B1 * | 9/2003 | Miklos | 370/236 |
| 6,694,469 B1 * | 2/2004 | Jalali et al. | 714/748 |
| 7,028,094 B2 * | 4/2006 | Le et al. | 709/230 |
| 7,447,905 B2 * | 11/2008 | Wang | 713/160 |
| 2002/0082033 A1 * | 6/2002 | Lohtia et al. | 455/517 |
| 2003/0086415 A1 * | 5/2003 | Bernhard et al. | 370/352 |
| 2003/0210710 A1 * | 11/2003 | Odman | 370/471 |

* cited by examiner

DATA TRANSFER PROCEDURE FOR TRANSFERRING DATA OF A DATA SEQUENCE BETWEEN A TRANSMITTING ENTITY AND A RECEIVING ENTITY

BACKGROUND OF THE INVENTION

I. Field of the Invention

The present invention relates generally to a data transfer procedure for transferring data of a data sequence between a transmitting entity and a receiving entity. The invention also relates to a communication system and to a transmitting entity in which the procedure is effected. The invention provides a method of and apparatus for recovering data lost in a transmission, and is useful for improving the reliability of data unit delivery in a packet radio system but is not limited to such an application.

II. Description of the Related Art

The general packet radio system (GPRS) is a packet data based communication system that has been developed for GSM networks with the aim of providing networks built to this standard with a way to handle higher data speeds and packet switched connections. GPRS can also be used in time division multiple access (TDMA) networks (IS-136). It is intended to provide a transitional path to third generation (3G) wireless data services It enables the introduction of packet switching and Internet Protocol (IP). The GPRS standard is now well defined and is currently being deployed in existing GSM-based mobile networks, in order to provide a way for GSM operators to meet the growing demand for wireless packet data services.

The GPRS standard defines a logical link control (LLC) layer which provides a logical link between a mobile station (MS) and a serving GPRS support node (SGSN). The logical link control (LLC) provides services necessary to maintain a ciphered data link between the MS and the SGSN. The logical link is maintained as the MS moves between cells serviced by the same SGSN. When the MS moves to a cell being serviced by a different SGSN the existing connection is released and a new logical link connection is established.

The logical link control (LLC) provides for acknowledged and unacknowledged point-to-point delivery of LLC protocol data units (PDUs) between the mobile station (MS) and the serving GPRS support node (SGSN) and point to multipoint delivery of packets from the SGSN to the MS. The LLC layer also provides for detecting errors from corrupted PDUs by checking a frame check sequence (FCS) in the LLC frame format. The FCS contains the value of a cyclic redundancy check (CRC) calculation performed over a header and information fields in a frame. For the acknowledged mode of transfer, the LLC may request retransmission of the frames of data for which an acknowledgement has not been received.

Network layer protocols are intended to operate over services derived from a wide variety of sub-networks and data links. GPRS supports several network layer protocols providing protocol transparency for users of the service. All functions relating to the transfer of network protocol data units (N-PDUs) are carried out transparently by GPRS network entities. A layer known as the Sub-Network Dependant Convergence Protocol (SNDCP) provides this protocol transparency and support for a variety of network layer protocols. The SNDCP is logically situated below the network layer and above the LLC layer. It performs multiplexing of data coming from different sources before the data is sent via the logical link control (LLC) layer.

Data to be transmitted is first multiplexed by the SNDCP. The data is then segmented to maximum length LLC frames that are then sent over the LLC to the mobile station (or other network entity). At the receiving entity the SNDCP layer reassembles the data in the LLC frames. The SNDCP can request that the data be transmitted in an acknowledged mode or an unacknowledged mode. In the acknowledged mode, the receipt of data is confirmed as delivered by the LLC layer and data transmission and reception between the SNDCP and LLC layers is done in order. In the unacknowledged mode, the receipt of data is not confirmed.

The nature of logical link control (LLC) operation is such that for an acknowledged operation, network protocol data unit (N-PDU) delivery confirmations from a sending LLC entity to a sending sub-network dependant convergence protocol (SNDCP) entity may be given in a non-sequential manner. N-PDU deliveries by a receiving LLC entity to a receiving SNDCP entity, on the other hand, must be given sequentially. In the case where multiple N-PDU buffering is employed in the sending SNDCP entity, the currently specified SNDCP operation is flawed under certain circumstances.

These circumstances may arise when the sending SNDCP entity has received delivery confirmation for a buffered N-PDU and discarded the buffered copy but, due to a loss of an earlier N-PDU on the radio link, the receiving LLC entity has not yet been able to pass on a completed sequence to the receiving SNDCP entity. Under the GPRS standard when a radio link deteriorates below a certain level or simply is broken, the system may initiate a link reestablishment procedure. Alternatively, an MS may move to another cell served by a different SGSN, and so an inter-SGSN routing area update procedure aimed at reestablishing the link may be invoked.

As a result of these procedures, the receiving LLC entity's re-sequencing buffer will be purged. In effect, the logical link is reset before continuing with the data transfer. However, if one of these procedures should occur after the sending entity has received delivery confirmation, but before the receiving LLC entity has passed on the completed sequence to the receiving SNDCP entity, the missing N-PDU will be lost in the purge. Any subsequent retransmission recovery procedures will fail to recover the lost data.

Figure 1A:
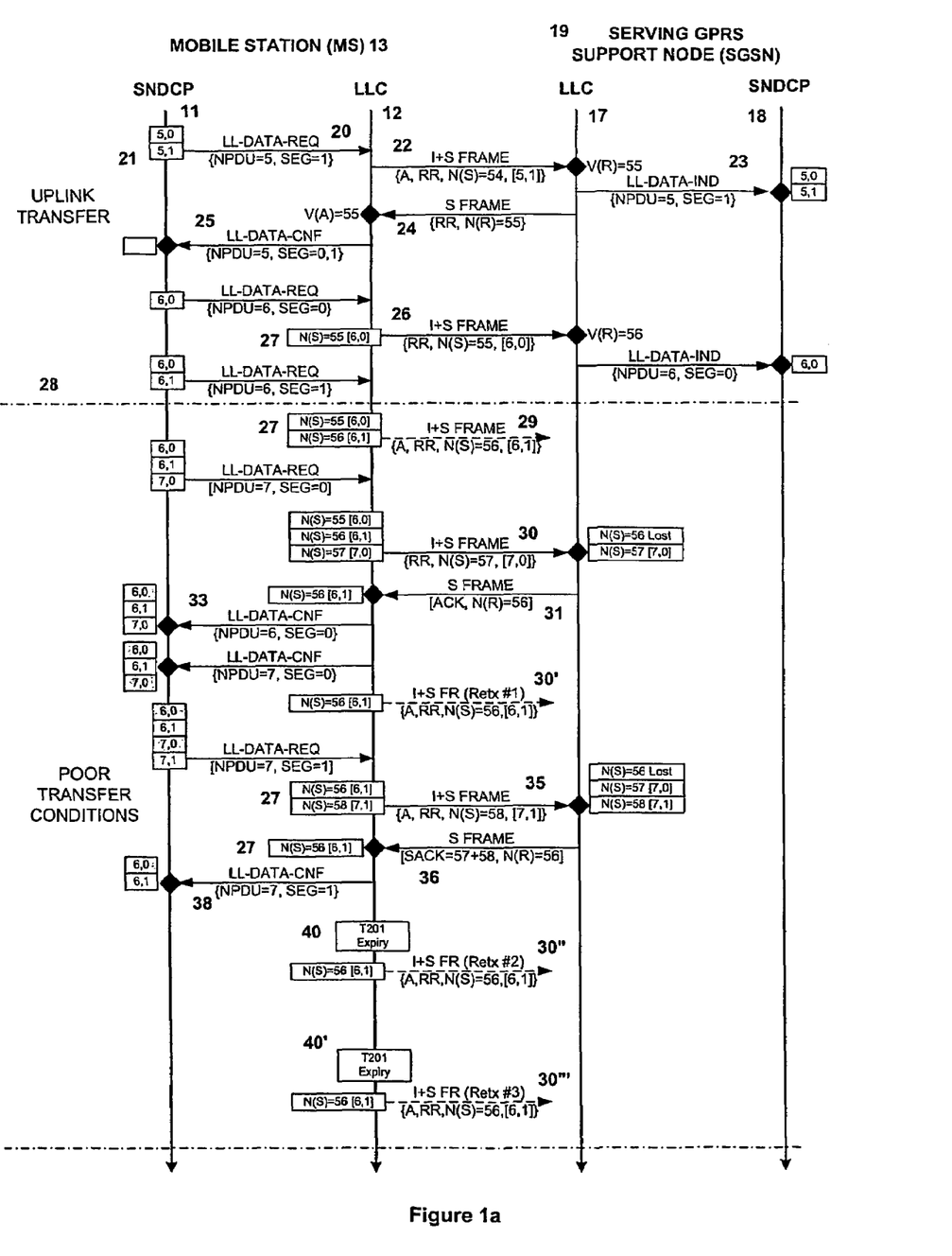
FIG. 1a shows an existing procedure for an uplink transfer of data under normal and deteriorating conditions, as previously described herein.
Figure 1B:
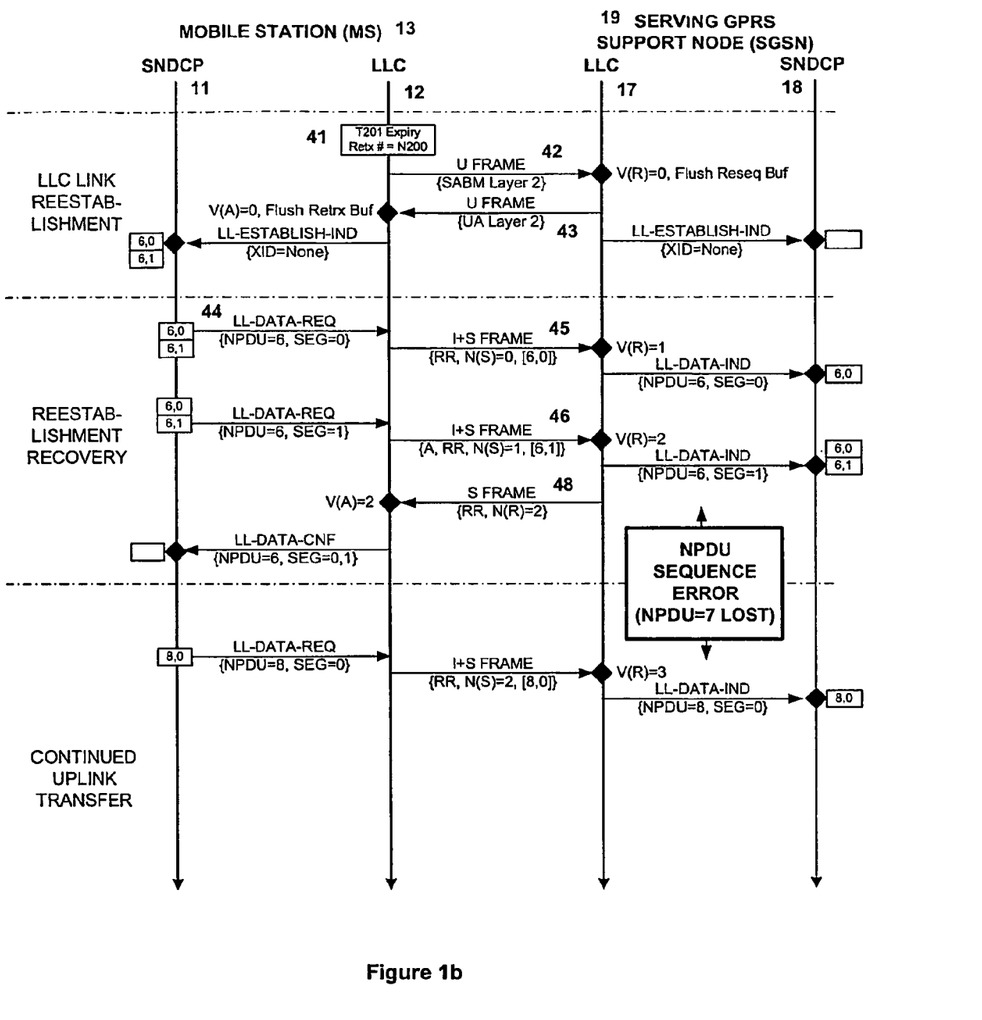
FIG. 1b shows an existing procedure for reestablishing and recovering a link following failure of the link, as previously described herein.

The problem may be better understood from consideration of the accompanying FIG. 1, which shows an example of how the SNDCP and LLC layers at a mobile station (MS) and a serving GPRS node (SGSN) interact over time under one of the aforementioned circumstances. FIG. 1 is divided into two parts. FIG. 1a shows the uplink transfer of data (i.e. from a mobile station to an SGSN) under normal and deteriorating conditions, and FIG. 1b shows how an LLC link is reestablished and recovered following failure of the link.

FIG. 1a shows time lines for an SNDCP layer 11 and an LLC layer 12 for a mobile station (MS) 13, and time lines for an LLC layer 17 and an SNDCP layer 18 for a serving GPRS node (SGSN) 19. Initially, a register or other buffer or store 21 in the SNDCP layer 11 in the MS 13 has two network protocol data units (N-PDUs), shown as segments [5,0] and [5,1] for transfer to the SGSN 19. The GPRS standard refers to these segments as sub-network protocol data units (SNPDUs), but the term "segment" will be used herein for the sake of clarity. The legend [5,0] represents the $0^{th}$ segment of the $5^{th}$ N-PDU in a sequence of N-PDUs. At this point in time, the segment [5,0] has already been sent from the MS 13 to the SGSN 19 and the segment [5,1] is about to be sent. The segment [5,0] is held in a register (or other suitable storage medium) by the SNDCP layer until it (the SNDCP layer) gets confirmation that all segments of the NPDU have been received by the receiving entity (i.e. the SGSN 19).

The SNDCP layer 11 sends a logical link data request 20 to the LLC layer 12 and that causes the LLC layer 12 to transmit an information-and-supervisory (I+S) frame 22 to the LLC 17 at the SGSN 19. The I+S frame 22 contains an acknowledgement request (A) for the receiving SGSN 19 asking it to send back an acknowledgement when the data has been received. The I+S frame 22 also contains both information in the form of the SNPDU segment [5,1] and supervisory data, which includes the send sequence number N(s) of the I+S frame.

In the example, the send sequence number is 54. Receipt of the I+S frame 22 at the LLC 17 causes the value in a register V(R) to be set to N(S)+1. The value V(R) indicates the number N(S) of the next in sequence expected to be received. N(S)=54 has just been received so the next number expected in the sequence is N(S)=55 and therefore the value in the register V(R) is set to 55. The LLC 17 passes the segment [5,1] up to the SNDCP 18 together with an indication LL-DATA-IND 23 indicating receipt at the LLC layer of all segments in sequence of this, the $5^{th}$, N-PDU.

The receiving LLC 17 also sends a supervisory S frame 24 back down to the sending LLC 12 in the MS 13, which S frame 24 includes a receiver ready RR flag and a next in sequence field N(R) indicating the number of the next frame in the sequence expected to be received by the LLC 17, in this case field 55. The LLC 12 at the MS 13 reacts to that S frame 24 by setting a register V(A) equal to 55, i.e. the value V(A) of the next in-sequence frame number to be acknowledged as received. That, in turn, causes a confirmation of receipt LL-DATA-CNF 25 to be sent up to the SNDCP layer 11 of the MS, confirming that both segments 0 and 1 of the $5^{th}$ N-PDU have been delivered. This causes the SNDCP 11 to delete the buffered copy of the $5^{th}$ NPDU from its buffer 21.

The next N-PDU segment in the sequence is [6,0]. For the sake of this example, the segment is shown as being transmitted in an I+S frame 26 without a request for an acknowledgment. The N-PDU [6,0] is transferred over to the receiving SNDCP 18 of the SGSN 19 in the same manner as previously described, except that there is no acknowledgement sent back once the data has been received. A register 27 in the LLC 12 of the MS 13 holds a buffered copy of the frame N(S)=55, that records that the data has been sent but not acknowledged as received by the receiving LLC entity 17.

For the purpose of explanation, assume now that the transfer conditions deteriorate, as represented by the broken line 28 in FIG. 1a. The next N-PDU segment in the sequence [6,1] is transferred from the SNDCP layer of the MS 13 to the LLC layer 12 where it is transmitted in an I+S frame 29 together with other system data including an acknowledgement request A. An entry, N(S)=56 is added to the register 27 indicating that that data too has been sent and not yet acknowledged as received.

Normally, the receiving LLC entity 17 would in due course send back an acknowledgement of receipt of the segment [6,1], as requested. Receipt of the segment [6,0] is implicit in the receipt of an acknowledgement of the segment [6,1]. However, in this example, the segment [6,1] has not transferred to the receiving SGSN and therefore no acknowledgement is sent by the receiving LLC layer 17.

Next, the SNDCP provides N-PDU [7,0] to the LLC 12 for transmission. Buffered frame N(S)=57 is added to the register 27 for the segment [7,0] and the segment is transmitted between the LLCs 12 and 17 in an I+S frame 30. That frame 30 gets through to the receiving LLC 17. However, the receiving LLC 17 can determine from the register V(R)=56 that the next in sequence frame should be 56, and not 57, the sequence number in the frame that it has just received. It therefore determines that the $56^{th}$ frame in the sequence has not yet got through.

As mentioned previously herein, one of the tasks of the LLC layer is to order the data in the correct sequence before passing it up to the SNDCP. The LLC 17 therefore holds onto segment [7,0] and does not pass it up to the SNDCP layer 18 of the SGSN 19. It does, however, send back an acknowledgement ACK in an S frame 31, together with an indicator N(R)=56. The acknowledgement is for the frame 57 (for which an acknowledgement was requested) and the indicator tells the sending LLC 12 that the receiving LLC has received all frames up to frame 55.

Implicit in this is that the segment conveyed by frame N(S)=56 is therefore lost. The sending LLC 12 responds to this implicit information by clearing the register 27 of the buffered frame copies N(S)=55 and N(S)=57, because these have been acknowledged as having been received by the SGSN 19, and by sending information LL-DATA-CNF 33 confirming delivery to the SGSN 19. First, the LLC 12 sends up a receipt of the [6,0] segment and next it sends up a delivery confirmation for the [7,0] segment. The SNDCP deduces from this that segment [6,1] has not been received and so holds onto buffered copies of both it and segment [6,0]. Together segments [6,0] and [6,1] make up the $6^{th}$ N-PDU and all of the information for that N-PDU is retained by the transmitting SNDCP 11, until delivery has been confirmed.

At this point in time the LLC 12 attempts to retransmit the missing segment [6,1], as represented by broken line 30'. The SNDCP 11 provides the LLC 12 with the next segment [7,1] in the sequence for transmission to the receiving entity. The register 27 therefore contains retransmission copies of both the segment [6,1] (N(S)=56) and the segment [7,1] (N(S)=58). An I+S frame 35 is transmitted containing segment [7,1] and that frame is received by the receiving LLC.

The Receiving LLC sends back a S frame 36 to the transmitting LLC, which S frame 36 contains both a selective acknowledgement (SACK) of the two sequence numbers N(S)=57 and 58 and the indicator N(R)=56. The presence of the indicator, again, implies that frame 56 is still lost. The retransmission copy of frame of N(S)=58 is removed from the register 27 and a signal LL-DATA-CNF 38 confirming delivery of the segment [7,1] is sent up to the SNDCP 11. The segments [7,0] and [7,1] are therefore considered by the SNDCP layer 11 to have been delivered and are removed from the retransmission buffer of that layer.

The mobile station then waits for a predetermined period of time as determined by a system timer 40, known as "T201". When the T201 timer period expires, another attempt is made (Retx#2) to transmit the I+S frame 30" containing the segment [6,1]. That attempt also fails (as determined by a lack of a reply by the time that T201 40' again expires) and so a further attempt is made to transmit the I+S frame. This is represented by the retransmission (Retx#3) 30''' shown at the bottom of FIG. 1a.

The timeline is continued at the top of FIG. 1b. When the number of failed retransmissions is equal to a value held in a register 41 known in the GPRS standard as "N200" (in this example N200=3), the LLC 12 at the MS 13 responds by abandoning the retries and attempting instead to reestablish the LLC link. The LLC 12 at the transmitting mobile station (MS) transmits an unnumbered or "U" frame 42 containing an LLC layer 2 initiated SABM command (set asynchronous balanced mode). The purpose of this is to cause the LLC link to be reset prior to the link being reestablished.

The LLC at the receiving SGSN responds by sending back to the LLC at the transmitting MS a U frame 43 containing an unnumbered acknowledgement response (UA layer 2) which is taken as an acknowledgement of the SABM command. Both LLCs 12, 17 then send a signal LL-ESTABLISH-IND to their respective SNDCP layers 11, 18 containing the information XID=None, which implies a layer 2 originated instruction, i.e. an LLC originating instruction. The registers at LLC layers in both the transmitting MS and the receiving SGSN are then flushed (contents reset to zero or other quiescent state) and the LLC link is thus reset.

The next few operations serve to recover from re-establishing the link. Note the similarity with the first few exchanges shown in FIG. 1a. First, the SNDCP 11 at the MS 13 resends down to the LLC layer 12 the data for segment [6,0] in the form of a logical link data request 44 that causes the LLC layer 12 to transmit an information-and-supervisory (I+S) frame 45 to the receiving LLC 17 at the SGSN 19.

This I+S frame 45 (N(S)=0) is received in-sequence, so the data for the N-PDU segment [6,0] is simply passed by the LLC layer 17 up to the receiving SNDCP 19. The I+S frame 45 contains supervisory data, which includes the send sequence number N(s) of the N-PDU. In the example, the send sequence number N(S) is now 0 because the LLC layers have been reset. Receipt of the I+S frame 45 at the LLC 17 causes the value in a register V(R) to be set to N(S)+1=1. The value V(R) indicates the number of the next in sequence expected to be received. The LLC layers have been reset to zero so the next number expected to be received will be 1, i.e. V(R)=1.

The segment [6,1] is next resent down from the SNDCP layer 11 of the MS 13 to the LLC layer 12. The LLC layer 12 reacts by transmitting another information-and-supervisory (I+S) frame 46 to the LLC 17 at the SGSN 19. This time the I+S frame 46 does contain an acknowledgement field A, effectively asking the receiving LLC 17 to send back an acknowledgement when the data has been received. The I+S frame 46 also contains the send sequence number N(S)=1. Receipt of the I+S frame 46 at the LLC 17 causes the value V(R) to be set to 2. The LLC 17 passes the segment [6,1] up to the SNDCP 18 as it was received in-sequence.

The LLC 17 also sends a supervisory S frame 48 back down to the LLC 12 in the MS 13 including a receiver ready RR flag and a next in sequence field N(R) indicating the number of the next frame in the sequence expected to be received by the LLC 17, in this case field 2. The LLC 12 at the MS 13 reacts to that S frame 48 by setting a register V(A) equal to 2, i.e. the value of the next in-sequence frame number to be acknowledged as received. That, in turn, causes a confirmation of delivery LL-DATA-CNF to be sent up to the SNDCP layer 11 of the MS 13, confirming that both segments 0 and 1 of the 6$^{th}$ N-PDU have been delivered.

The SNDCP 11 was "told" earlier that the receiving SGSN had received the 7$^{th}$ N-PDU. When the receiving LLC 17 received segments [7,0] and [7,1] it sent back an acknowledgement SACK=57+58 in an S frame 36 (see FIG. 1a) and the retransmission copy of NPDU 7 was deleted from register 21. The 6$^{th}$ N-PDU has also been received and acknowledged as such, so the SNDCP "thinks" that the next segment to be sent is [8,0] and behaves accordingly.

However, the truth is that the 7$^{th}$ N-PDU never got sent up to the SNDCP 18 layer of the receiving SGSN 19 because the LLC 17 thereof was waiting for the receipt of segment [6,1], so that it could pass all of the segments [6,1], [7,0] and [7,1] up to the SNDCP layer 18 in-sequence, as it is required to do. When the LLC layers 12, 17 were reset the segments [7,0] and [7,1] in LLC 17 were deleted. As the sending SNDCP 11 has already deleted its retransmission copy of NPDU 7 when earlier delivery confirmation was given by sending LLC 12, there is no way to resend NPDU 7 and so NPDU 7 is permanently lost under these procedures.

However, this is unsatisfactory because the purpose of the LLC and SNDCP layers in the acknowledged mode of operation is to provide a highly reliable link without data loss, for use by fault intolerant applications. The standard as currently defined is therefore failing in its stated task.

SUMMARY OF THE INVENTION

According to one aspect of the invention there is provided a data transfer procedure for transferring data of a data sequence between a transmitting entity and a receiving entity, which entities each comprise a higher data handling layer and a lower data handling layer, the procedure comprising: transferring down from the higher data handling layer of the transmitting entity to the lower data handling layer of the transmitting entity a data unit of the data sequence, which data unit comprises at least one segment; transmitting via a transmission link between the transmitting entity and the receiving entity each of the at least one segment from the lower data handling level of the transmitting entity to the lower data handling level of the receiving entity; sending an acknowledgement of receipt of the at least one segment from the lower data handling level of the receiving entity to the lower data handling level of the transmitting entity; transferring up the at least one segment from the lower data handling layer of the receiving entity to the higher data handling layer of the receiving entity in data sequence order; and wherein the higher data handling layer of the transmitting entity is arranged to retain a copy of the data unit until such time as an at least implied acknowledgement of receipt of earlier segments in the sequence is sent back from the receiving entity to the lower data handling level of the transmitting entity.

According to another aspect of the invention there is provided a data transfer procedure for transferring to a receiving entity data of a data sequence from a transmitting entity comprising a higher data handling layer and a lower data handling layer, the procedure comprising: transferring down from the higher data handling layer to the lower data handling layer a data unit of the data sequence, which data unit comprises at least one segment; transmitting on a transmission link from the lower data handling level of the transmitting entity each of the at least one segment for the receiving entity; receiving at the lower data handling level an acknowledgement of receipt of the at least one segment from the receiving entity; and wherein the higher data handling layer of the transmitting entity is arranged to retain a copy of the data unit until such time as an at least implied acknowledgement of receipt of earlier segments in the sequence is received from the receiving entity at the lower data handling level.

According to a further aspect of the invention there is provided a communication system comprising: a transmitting entity for transmitting data of a data sequence, which transmitting entity comprises a higher data handling layer and a lower data handling layer; a receiving entity for receiving the data of the data sequence, which receiving entity comprises a higher data handling layer and a lower data handling layer; means for transferring down from the higher data handling layer of the transmitting entity to the lower data handling layer of the transmitting entity a data unit of the data sequence, which data unit comprises at least one segment; means for transmitting via a transmission link between the transmitting entity and the receiving entity each of the at least one segment from the lower data handling level of the transmitting entity to the lower data handling level of the receiving entity; means for sending an acknowledgement of receipt of the at least one segment from the lower data handling level of the receiving entity to the lower data handling level of the transmitting entity; means for transferring up the at least one segment from the lower data handling layer of the receiving entity to the higher data handling layer of the receiving entity in data sequence order; and wherein the higher data handling layer of the transmitting entity is arranged to retain a copy of the data unit until such time as an at least implied acknowledgement of receipt of earlier segments in the sequence is sent back from the receiving entity to the lower data handling level of the transmitting entity.

The invention also provides transmitting entity for transmitting data of a data sequence for a receiving entity in a communications system, the transmitting entity comprising: a higher data handling layer; a lower data handling layer; means for transferring down from the higher data handling layer to the lower data handling layer a data unit of the data sequence, which data unit comprises at least one segment; means for transmitting on a transmission link from the lower data handling level each of the at least one segment for the receiving entity; means for receiving at the lower data handling level an acknowledgement of receipt of the at least one segment from the receiving entity; and means for causing the higher data handling layer to retain a copy of the data unit until such time as an at least implied acknowledgement of receipt of earlier segments in the sequence is received at the lower data handling level from the receiving entity.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN EMBODIMENT OF THE INVENTION

In a GPRS system where reliable delivery of network layer packets is required, it is the function of the logical link control (LLC) layer and the radio link control (RLC) layer to ensure that where delivery has been unsuccessful, appropriate action is taken to retransmit lost information and so guarantee delivery. The LLC and RLC layers have limits to the performance of their recovery mechanisms. The sub-network dependant convergence protocol (SNDCP) is permitted to maintain its own recovery mechanism of retransmission to supplement that of the lower layers, for use when such limits are exceeded.

One of the functions of the sub-network dependant convergence protocol (SNDCP) is to take network layer packets, so-called network protocol data units (N-PDUs), and to segment these into potentially smaller segments, so-called sub-network protocol data units (SNPDUs), for encapsulating into link layer protocol data units (LLPDUs), which are given to the LLC layer for transport to the receiving SNDCP entity.

The receiving SNDCP entity must re-assemble the segments (SNPDUs) into N-PDUs for onward delivery to the network layer. It is crucial that the receiving LLC layer deliver these to the receiving SNDCP layer in the correct sequence for successful reassembly. Where segments (SNPDUs) are lost due to error in the radio link, the LLC layer is responsible for re-sequencing any received but retransmitted SNPDUs before delivery to the receiving SNDCP.

The sending SNDCP entity is sent confirmation of SNPDU delivery by the LLC layer when the sending LLC entity receives acknowledgement signaling, from the receiving LLC entity. The nature of LLC operation is such that SNPDU delivery confirmations to the sending SNDCP entity may arrive out of sequence, and only signify the successful delivery to the receiving LLC entity. SNPDUs will only be passed up to the receiving SNDCP entity when the receiving LLC entity has received complete SNPDU sequences, i.e. when it has received all of the segments of an N-PDU.

The GPRS standard defines a LLC link reestablishment procedure, which is of no consequence under regular operational conditions, but which is invoked under poor transfer conditions when the LLC entity's link with its peer is lost. The LLC link re-establishment procedure resets the LLC layer and purges LLC re-transmission and re-sequencing buffers. Under such conditions, as previously explained herein, a sending SNDCP entity may have been given confirmation of SNPDU delivery, but because the receiving LLC layer had not yet completed a re-sequencing of the SNPDUs, they have now been deleted before the receiving SNDCP entity had actually received them.

The sending SNDCP entity maintains a buffered copy of the original NPDU, and does not delete this until all SNPDU segments of the original NPDU are confirmed delivered. Therefore, an LLC link re-establishment procedure can cause the SNDCP entity to retransmit all SNPDU segments of the N-PDU as a recovery mechanism. However, where the sending SNDCP entity buffers multiple N-PDUs, this recovery mechanism is insufficient to guarantee successful recovery.

The existing mechanism is flawed in that where a buffered NPDU copy is discarded, the delivered and confirmed NPDU (as a sequence of SNPDUs) may have been purged during LLC link reestablishment whilst awaiting re-sequencing, because of an earlier NPDU not having been fully delivered.

This problem can, however, be overcome by modifying the procedure to ensure that buffered N-PDUs are discarded in-sequence, in a manner consistent with the in-sequence delivery by the receiving LLC layer to the receiving SNDCP layer. Thus, when the receiving LLC entity's re-sequencing buffer is purged during link re-establishment, the sending SNDCP entity's recovery process can successfully retransmit all purged data without loss.

An example of how the modified procedure operates in practice is shown in FIG. 2 of the accompanying drawings. This diagram is similar to FIG. 1 in that it shows an example of SNDCP and LLC layers at a mobile station (MS) and a serving GPRS node (SGSN) interacting over time. Like FIG. 1, FIG. 2 is divided into two parts that show (a) an uplink transfer of data (i.e. from a mobile station to an SGSN) under normal and deteriorating conditions, and (b) LLC link recovery following failure of the link. In the interest of brevity, the following description will concentrate on the differences in FIG. 2.

Figure 2A:
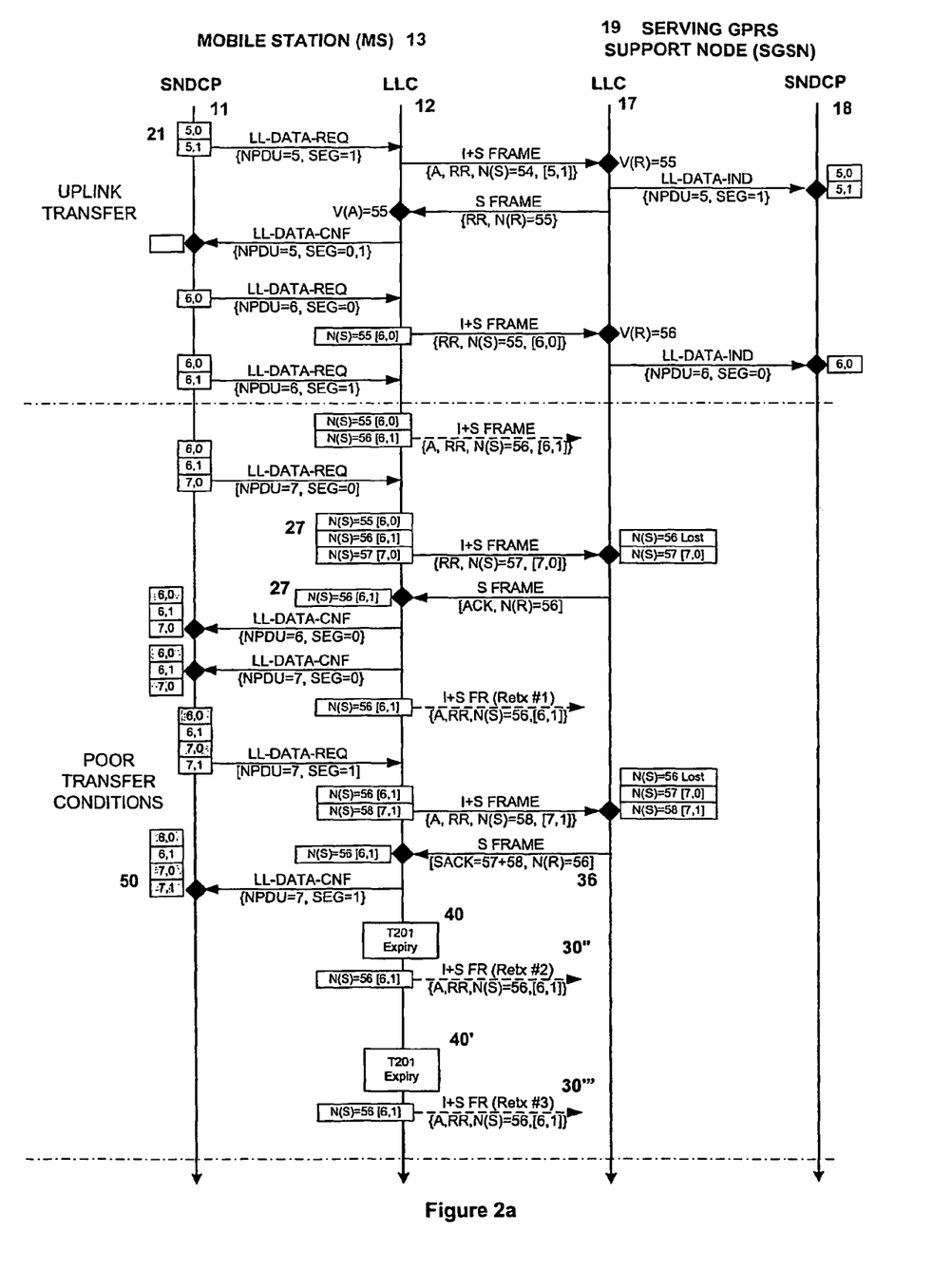
FIG. 2a shows a new procedure for an uplink transfer of data under normal and deteriorating conditions.

FIG. 2a is identical to FIG. 1a in that it begins with the register 21 in the SNDCP layer 11 in the MS 13 holding two network protocol data units (N-PDUs), shown as segments

[5,0] and [5,1] for transfer to the SGSN 19. The procedure continues as described previously with reference to FIG. 1*a* up to the point in time where the S frame 36, containing both a selective acknowledgement (SACK) of the two sequence numbers N(S)=57 and 58 and the indicator N(R)=56, is received by the LLC 12 and the LLC deletes the retransmission copy of frame N(S)=58 from the register 27. However, unlike FIG. 1*a*, the retransmission copies of segments (SNPDUs) [7,0] and [7,1] are not deleted from the register 21 in the SNDCP layer 11, but are simply marked as confirmed. As the segment (SNPDU) [6,1] has not been confirmed as delivered, but that a later segment such as [7,0] has been confirmed as delivered, it is therefore known by implication that the receiving LLC entity 17 has not yet passed segments (SNPDUs) [7,0] and [7,1] to the receiving SNDCP layer 18, as it must wait for completed sequences to be received before doing so. The re-sequencing buffer is at risk of being purged as a result of one of two aforementioned procedures. It is therefore better for the sending SNDCP entity 11 to retain retransmission copies of confirmed segments (SNPDUs) [7,0] and [7,1] in case of such an event, and only delete them if confirmed as delivered in-sequence.

The remainder of FIG. 2*a* is identical to what is shown in FIG. 1*a*, with the LLC layer of the MS attempting second and third retransmissions 30" and 30'" of the [6,1] segment following time-outs of the T201 system timer 40, 40'.

At the top of FIG. 2*b*, and in the same manner as previously described with reference to FIG. 1*b*, during a link reestablishment period 51 when the number of failed retransmissions N200=3, the LLC 12 at the MS 13 responds by abandoning the retries and attempting instead to reestablish the LLC link. This results in the registers 27 at the LLC layers 12, 17 in both the transmitting MS 13 and the receiving SGSN 19 being flushed so that their contents are reset to zero.

However, unlike FIG. 1*b*, at the end of the link reestablishment period 51 after the LLC layers have been flushed, the transmitting SNDCP layer 11 still has the buffered retransmission copies of segments [7,0] and [7,1] in its register 21, together with the buffered retransmission copies of segments [6,0] and [6,1]. Thus, when the system reestablished the LLC link, the transmitting SNDCP 11 determines that it has to resend both the segments of the $6^{th}$ N-PDU and the segments of the $7^{th}$ N-PDU.

The next stage of the procedure is reestablishment recovery 52, which begins with the SNDCP 11 at the MS 13 sending down to the LLC layer 12 the data for segment [6,0]. The data is sent down in the form of a logical link data request LL-DAT-REQ 64 that causes the LLC layer 12 to transmit an information-and-supervisory (I+S) frame 65 to the receiving LLC 17 at the SGSN 19.

This I+S frame 65 is received in-sequence, so the data for the N-PDU segment [6,0] is simply passed by the LLC layer 17 up to the receiving SNDCP 19. The I+S frame 65 contains supervisory data, which includes the send sequence number N(s) of the N-PDU. In the example, the send sequence number N(S) is now 0 because the LLC layers have been reset. Receipt of the I+S frame 65 at the LLC 17 causes the value in a register V(R) 67 to be set to N(S)+1=1. The value V(R) indicates the number of the next in sequence frame that LLC 17 would expect to be received. The LLC layers have been reset to zero so the next number expected to be received will be 1, i.e. V(R)=1.

The segment [6,1] is the next one passed down from the SNDCP layer 11 of the MS 13 to the LLC layer 12. The LLC layer 12 reacts by transmitting another information-and-supervisory (I+S) frame 66 to the LLC 17 at the SGSN 19. This time the I+S frame 66 does contain an acknowledgement field A, effectively asking the receiving LLC 17 to send back an acknowledgement when the data has been received. The I+S frame 66 also bears the send sequence number N(S)=1. Receipt of the I+S frame 66 at the LLC 17 causes the value V(R) to be set to 2. The LLC 17 passes the segment [6,1] up to the SNDCP 18 as it was received in-sequence.

The LLC 17 also sends a supervisory S frame 68 back down to the LLC 12 in the MS 13 including a receiver ready RR flag and a next in sequence field N(R) indicating the number of the next frame in the sequence expected to be received by LLC 17, in this case field 2. The LLC 12 at the MS 13 reacts to that S frame 68 by setting a register V(A) 69 equal to 2, i.e. the value of the last in-sequence framer number which would be expected to be acknowledged as received. That, in turn, causes a confirmation of receipt LL-DATA-CNF to be sent up to the SNDCP layer 11 of the MS 13, confirming that both segments 0 and 1 of the $6^{th}$ N-PDU have been delivered. Because the segments of the $6^{th}$ N-PDU have been confirmed in-sequence, they are then removed from the SNDCP layer 11, leaving the segments of the $7^{th}$ N-PDU in the SNDCP layer 11 for transmission.

Figure 2B:
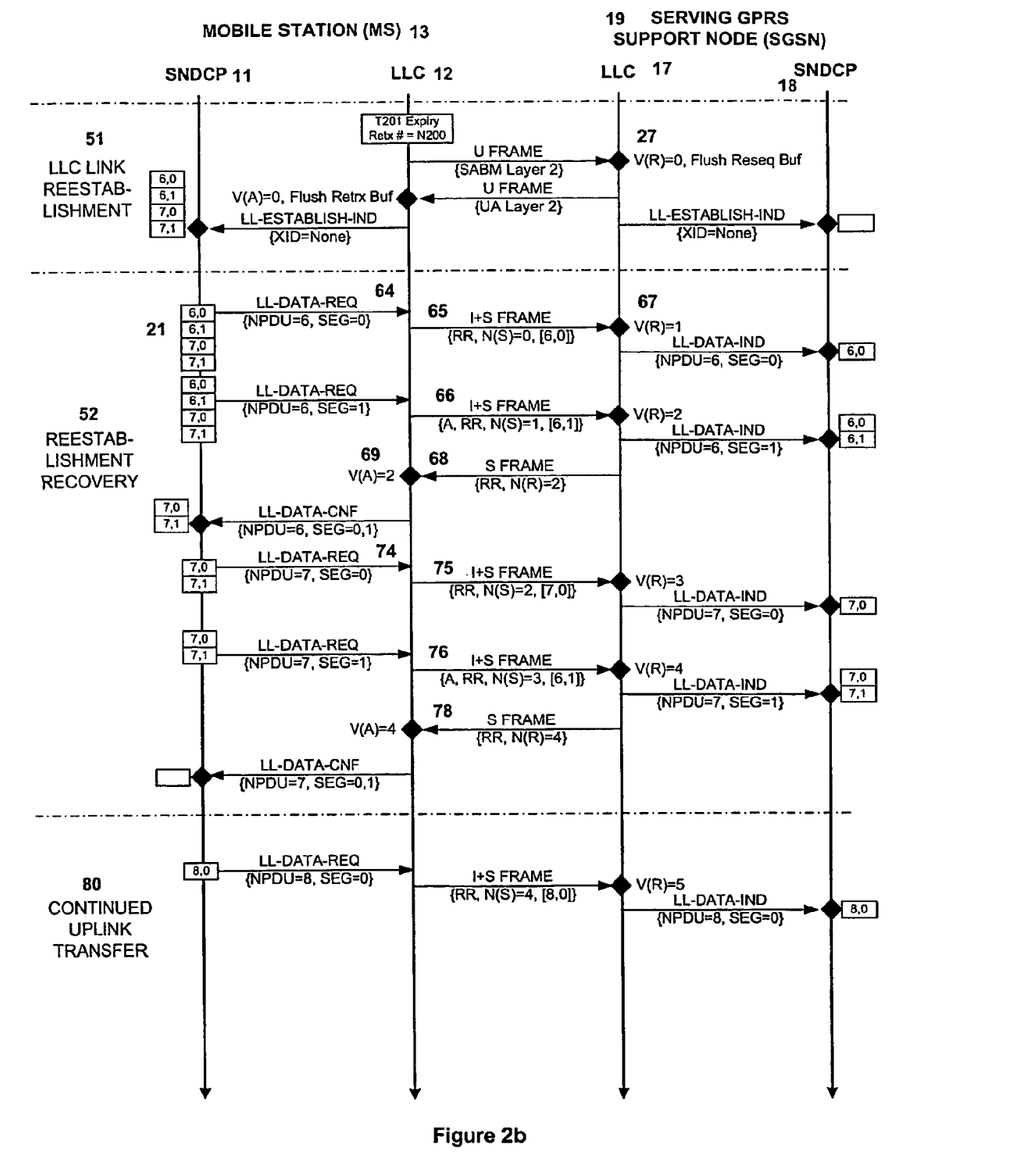
FIG. 2b shows a new procedure for reestablishing and recovering a link following failure of the link.

As can be seen from FIG. 2*b*, the procedure for the transmission of the segments [7,0] and [7,1] of the $7^{th}$ N-PDU from the SNDCP 11 of the MS 13 to the SNDCP 18 of the SGSN 19 is exactly the same as that for the $6^{th}$ N-PDU. Signals 74 to 78 relating to the segments of the $7^{th}$ N-PDU correspond with signals 64 to 68 relating to the segments of the $6^{th}$ N-PDU.

Once a confirmation of receipt LL-DATA-CNF has been sent up to the SNDCP layer 11 of the MS 13, confirming that both segments 0 and 1 of the $7^{th}$ N-PDU have been received, the transfer continues in the usual manner 80 for the next N-PDU in the sequence (i.e. the $8^{th}$ N-PDU).

It will be appreciated from the foregoing example that the method described provides greater reliability of data transfer at the SNDCP layer under adverse channel conditions than was previously possible, due to the successful delivery of NPDU 7 to SNDCP 18 of SGSN 19.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

The invention claimed is:

1. A data transfer procedure for transferring data of a data sequence to a receiving entity from a transmitting entity comprising:
   transferring down from a higher data handling layer of the transmitting entity to a lower data handling layer of the transmitting entity a plurality of data units of the data sequence, wherein each of the plurality of data units has a relative position in the data sequence;
   buffering, at the higher data handling layer of the transmitting entity, the plurality of data units;
   transmitting on a first transmission link from the lower data handling layer of the transmitting entity each of the plurality of data units to the receiving entity;
   buffering, at the lower data handling layer of the transmitting entity, the plurality of data units;
   receiving at the lower data handling layer of the transmitting entity an acknowledgement of receipt of at least one later positioned one of the plurality of data units from the receiving entity;
   sending a confirmation of receipt of the at least one later positioned one of the plurality of data units from the lower data handling layer of the transmitting entity to the higher data handling layer of the transmitting entity based on the acknowledgement;

discarding in-sequence any buffered data units at the higher data handling layer of the transmitting entity based on received confirmations;

determining that the first transmission link is broken;

purging the buffered plurality of data units at the lower data handling layer of the transmitting entity upon determining the first transmission link is broken;

maintaining the buffering of the at least one later positioned one of the plurality of data units and an earlier positioned one of the plurality of data units at the higher data handling layer of the transmitting entity, upon determining the first transmission link is broken, if at least an implied acknowledgement of receipt of the at least one earlier positioned one of the plurality of data units in the sequence is not received from the receiving entity at the lower data handling layer of the transmitting entity;

establishing a second transmission link between the transmitting entity and the receiving entity; and retransmitting, via the second transmission link, the at least one earlier positioned one of the plurality of data units and the at least one later positioned one of the plurality of data units buffered at the higher data handling layer of the transmitting entity.

2. A data transfer procedure as claimed in claim 1, wherein the higher data handling layer of the transmitting entity comprises a store for storing data units, and further comprising maintaining buffered data units in the store until a corresponding acknowledgement of receipt has been received, when the corresponding data unit is then removed from the store.

3. A data transfer procedure as claimed in claim 1, wherein receiving the acknowledgement further comprises receiving an indication of the respective position of the at least one later positioned one of the plurality of data units.

4. A data transfer procedure as claimed in claim 1, wherein the first transmission link is determined to be broken by:
   the transmitting entity waiting for a period of time for an acknowledgement of receipt of at least one of the plurality of data units from the lower data handling layer of the receiving entity;
   retransmitting the at least one of the plurality of data units;
   repeating the waiting and the retransmitting of the at least one of the plurality of data units; and
   deciding that the first transmission link is broken after the waiting and the retransmitting of the at least one of the plurality of data units have been repeated a number of times.

5. A data transfer procedure as claimed in claim 1, wherein the transmitting entity is a mobile station for a GPRS system.

6. A data transfer procedure as claimed in claim 5, wherein the higher data handling layer is an SNDCP layer and the lower data handling layer is an LLC layer.

7. A data transfer procedure as claimed in claim 1, wherein maintaining the buffering of the at least one later positioned one of the plurality of data units and an earlier positioned one of the plurality of data units at the higher data handling layer of the transmitting entity is based on the lower data handling layer of the receiving entity being restricted to passing complete data units in sequence up to the higher data handling layer of the receiving entity.

8. A data transfer procedure as claimed in claim 7, wherein the at least one earlier positioned one of the plurality of data units comprises a plurality of segments, further comprising:
   receiving, from the lower data handling layer of the receiving entity, an acknowledgement for at least one of the plurality of segments at the lower data handling layer of the transmitting entity;
   wherein determining that the first transmission link is broken is based on not receiving, from the lower data handling layer of the receiving entity, an acknowledgement for at least one remaining one of the plurality of segments at the lower data handling layer of the transmitting entity; and
   wherein establishing the second transmission link further comprises exchanging messages between the lower data handling layer of the transmitting entity and the lower data handling layer of the receiving entity causing both the lower data handling layer of the transmitting entity and the lower data handling layer of the receiving entity to purge any buffered data units.

9. A transmitting entity for transmitting data of a data sequence to a receiving entity in a communications system, the transmitting entity comprising:
   a higher data handling layer;
   a lower data handling layer;
   means for transferring down from the higher data handling layer of the transmitting entity to the lower data handling layer of the transmitting entity a plurality of data units of the data sequence, wherein each of the plurality of data units has a relative position in the data sequence;
   means for buffering, at the higher data handling layer of the transmitting entity, the plurality of data units;
   means for transmitting on a first transmission link from the lower data handling layer each of the plurality of data units to the receiving entity;
   means for buffering, at the lower data handling layer of the transmitting entity, the plurality of data units;
   means for receiving at the lower data handling layer an acknowledgement of receipt of at least one later positioned one of the plurality of data units from the receiving entity;
   means for sending a confirmation of receipt of the at least one later positioned one of the plurality of data units from the lower data handling layer to the higher data handling layer based on the acknowledgment;
   means for discarding in-sequence any buffered data units at the higher data handling layer of the transmitting entity based on received confirmations;
   means for determining that the first transmission link is broken;
   means for purging the buffered plurality of data units at the lower data handling layer of the transmitting entity upon determining the first transmission link is broken;
   means for maintaining the buffering of the at least one later positioned one of the plurality of data units and an earlier positioned one of the plurality of data units at the higher data handling layer of the transmitting entity, upon determining the first transmission link is broken, if at least an implied acknowledgement of receipt of the at least one earlier positioned one of the plurality of data units in the sequence is not received from the receiving entity at the lower data handling layer of the transmitting entity;
   means for establishing a second transmission link between the transmitting entity and the receiving entity; and
   means for retransmitting, via the second transmission link, the at least one earlier positioned one of the plurality of data units and the at least one later positioned one of the plurality of data units buffered at the higher data handling layer of the transmitting entity.

10. A transmitting entity as claimed in claim 9, wherein the higher data handling layer of the transmitting entity comprises a store for storing data units, and further comprising maintaining buffered data units in the store until a corresponding acknowledgement of receipt has been received, when the corresponding data unit is then removed from the store.

11. A transmitting entity as claimed in claim 9, wherein receiving the acknowledgement further comprises receiving an indication of the respective position of the at least one later positioned one of the plurality of data units.

12. A transmitting entity as claimed in claim 9, wherein the means for determining that the first transmission link is broken is operable to:
  wait for a period of time for on acknowledgement of receipt of at least one of the plurality of data units from a lower data handling layer of the receiving entity;
  retransmit the at least one of the plurality of data units;
  repeat the waiting and the retransmitting of the at least one of the plurality of data units; and
  decide that the first transmission link is broken after the waiting and the retransmitting of the at least one of the plurality of data units have been repeated a number of times.

13. A transmitting entity as claimed in any of claim 9, wherein the transmitting entity is a mobile station for a GPRS system.

14. A transmitting entity as claimed in claim 13, wherein the higher data handling layer is an SNDCP layer and the lower data handling layer is an LLC layer.

15. A data transfer entity as claimed in claim 9, wherein the means for maintaining the buffering of the at least one later positioned one of the plurality of data units and an earlier positioned one of the plurality of data units at the higher data handling layer of the transmitting entity is based on the lower data handling layer of the receiving entity being restricted to passing complete data Units in sequence up to the higher data handling layer of the receiving entity.

16. A data transfer entity as claimed in claim 15, wherein the at least one earlier positioned one of the plurality of data units comprises a plurality of segments, further comprising:
  means for receiving, from the lower data handling layer of the receiving entity, an acknowledgement for at least one of the plurality of segments at the lower data handling layer of the transmitting entity;
  wherein the means for determining that the first transmission link is broken is based on not receiving, from the lower data handling layer of the receiving entity, an acknowledgement for at least one remaining one of the plurality of segments at the lower data handling layer of the transmitting entity; and
  wherein the means for establishing the second transmission link further comprises means for exchanging messages between the lower data handling layer of the transmitting entity and the lower data handling layer of the receiving entity causing both the lower data handling layer of the transmitting entity and the lower data handling layer of the receiving entity to purge any buffered data units.

17. A transmitting entity for transmitting data of a data sequence to a receiving entity in a communications system, comprising:
  a higher data handling layer;
  a lower data handling layer;
  wherein the higher data handling layer is arranged to transfer down to the lower data handling layer a plurality of data units of the data sequence, wherein each of the plurality of data units has a relative position in the data sequence;
  wherein the higher data handling layer is arranged to better the plurality of data units;
  wherein the lower data handling layer is arranged to transmit on a first transmission link each of the plurality of data units to the receiving entity;
  wherein the lower data handling layer is arranged to buffer the plurality of data units;
  wherein the lower data handling layer is arranged to receive an acknowledgement of receipt of at least one later positioned one of the plurality of data units from the receiving entity;
  wherein the lower data handling layer is arranged to send a confirmation of receipt of the at least one later positioned one of the plurality of data units to the higher data handling layer based on the acknowledgement;
  wherein the higher data handling layer is arranged to discard in-sequence any buffered data units based on received confirmations;
  wherein the transmitting entity is arranged to determine that the first transmission link is broken;
  wherein the lower data handling layer is arranged to purge the buffered plurality of data units at the lower data handling layer of the transmitting entity upon determining the first transmission link is broken;
  wherein the higher data handling layer of the transmitting entity is arranged to maintain the buffering of the at least one later positioned one of the plurality of data units and an earlier positioned one of the plurality of data units at the higher data handling layer of the transmitting entity, upon determining the first transmission link is broken, if at least an implied acknowledgement of receipt of the at least one earlier positioned one of the plurality of data units in the sequence is not received from the receiving entity at the lower data handling layer of the transmitting entity;
  wherein the lower data handling layer is arranged to establish a second transmission link between the transmitting entity and the receiving entity; and
  wherein the lower data handling layer is arranged to retransmit, via the second transmission link, the at least one earlier positioned one of the plurality of data units and the at least one later positioned one of the plurality of data units buffered at the higher data handling layer of the transmitting entity.

18. A transmitting entity as claimed in claim 17, wherein the higher data handling layer of the transmitting entity comprises a store for storing data units, and wherein the higher data handling layer of the transmitting entity is further arranged to maintain buffered data units in the store until a corresponding acknowledgement of receipt has been received, when the corresponding data unit is then removed from the store.

19. A transmitting entity as claimed in claim 17, wherein the acknowledgement further comprises an indication of the respective position of the at least one later positioned one of the plurality of data units.

20. A transmitting entity as claimed in claim 17, wherein the transmitting entity is arranged to determine that the first transmission is broken by:
  waiting for a period of time for an acknowledgement of receipt of at least one of the plurality of data units from the lower data handling layer of the receiving entity;

retransmitting the at least one of the plurality of data units;

repeating the waiting and the retransmitting of the at least one of the plurality of data units; and deciding that the first transmission link is broken after the waiting and the retransmitting of the at least one of the plurality of data units have been repeated a number of times.

21. A transmitting entity as claimed in claim 17, wherein the transmitting entity is a mobile station for a GPRS system.

22. A transmitting entity as claimed in claim 21, wherein the higher data handling layer is an SNDCP layer and the lower data handling layer is an LLC layer.

23. A transmitting entity as claimed in claim 17, wherein the higher data handling layer of the transmitting entity is arranged to maintain the buffering of the at least one later positioned one of the plurality of data units and an earlier positioned one of the plurality of data units based on a lower data handling layer of the receiving entity being restricted to passing complete data units in sequence up to a higher data handling layer of the receiving entity.

24. A data transfer entity as claimed in claim 23, wherein the at least one earlier positioned one of the plurality of data units comprises a plurality of segments, further comprising:

wherein the lower data handling layer of the transmitting entity is arranged to receive, from the lower data handling layer of the receiving entity, an acknowledgement for at least one of the plurality of segments;

wherein the transmitting entity is arranged to determine that the first transmission link is broken is based on not receiving, from the lower data handling layer of the receiving entity, an acknowledgement for at least one remaining one of the plurality of segments; and wherein the transmitting entity is arranged to establish the second transmission link by exchanging messages between the lower data handling layer of the transmitting entity and the lower data handling layer of the receiving entity causing both the lower data handling layer of the transmitting entity and the lower data handling layer of the receiving entity to purge any buffered data units.

\* \* \* \* \*

UNITED STATES PATENT AND TRADEMARK OFFICE
CERTIFICATE OF CORRECTION

PATENT NO. : 7,720,079 B2  
APPLICATION NO. : 10/537836  
DATED : May 18, 2010  
INVENTOR(S) : Robinson et al.

Page 1 of 1

It is certified that error appears in the above-identified patent and that said Letters Patent is hereby corrected as shown below:

Column 13, line 17, claim 12: "for on" to read as --for an--

Column 13, line 27, claim 13: "in any of claim 9" to read as --in claim 9--

Column 13, line 39, claim 15: "Units" to read as --units--

Column 14, line 06, claim 17: "to better" to read as --to buffer--

Signed and Sealed this
Twelfth Day of July, 2011

David J. Kappos
*Director of the United States Patent and Trademark Office*